Oct. 6, 1953
L. M. FRANCIS
2,654,612
AUTOMOBILE-CARRYING TRAILER
Filed July 2, 1951
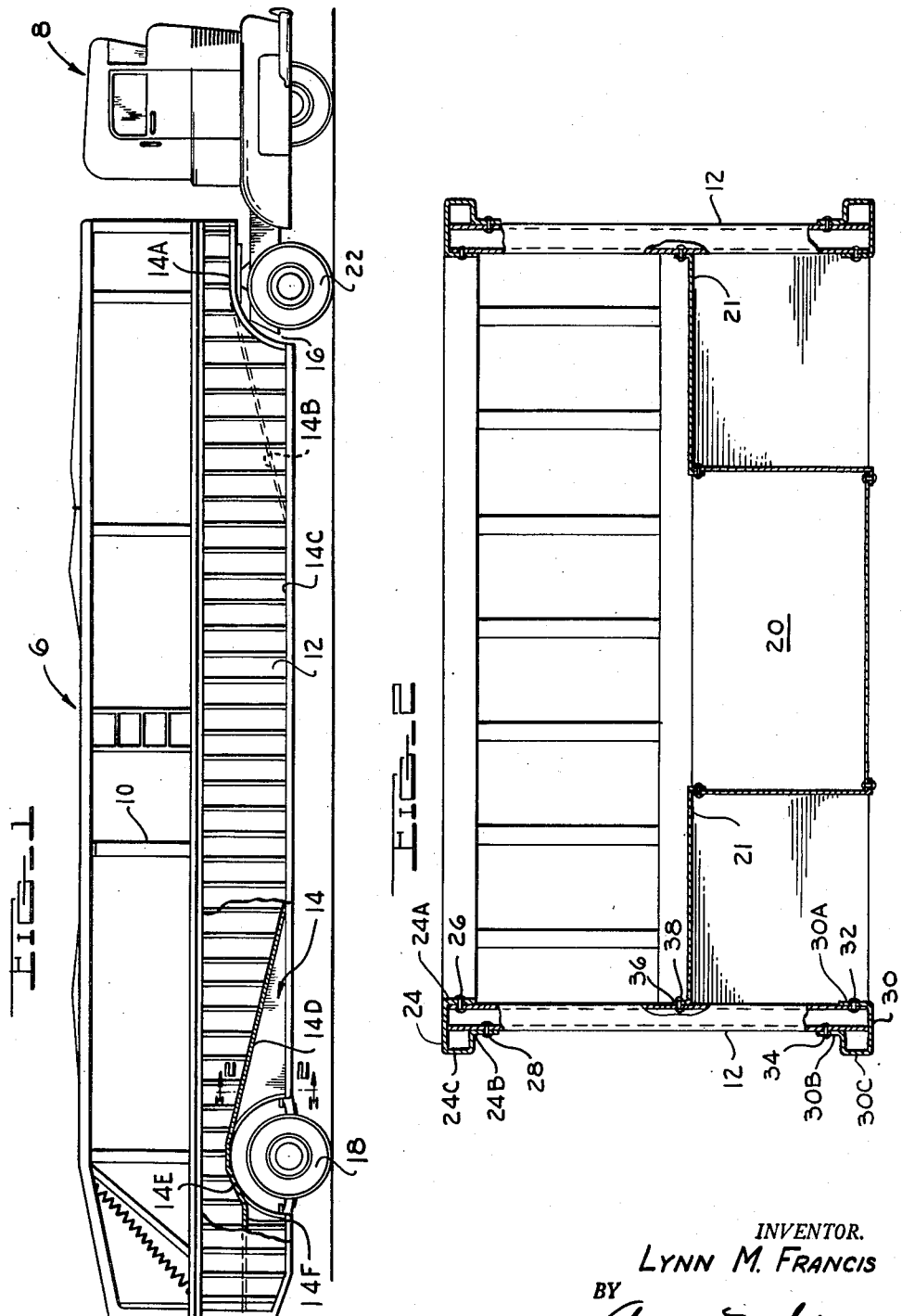
INVENTOR.
LYNN M. FRANCIS
BY
Arthur M. Smith
ATTORNEY Patented Oct. 6, 1953

2,654,612

UNITED STATES PATENT OFFICE 2,654,612

AUTOMOBILE-CARRYING TRAILER

Lynn M. Francis, Detroit, Mich.

Application July 2, 1951, Serial No. 234,829

3 Claims. (Cl. 280—33.05)

The present invention relates to an improved highway trailer construction which is particularly adapted for hauling automobiles. This is a continuation-in-part of Patent No. 2,583,734, dated January 29, 1952.

Prior to the present invention, the tire mileage usually obtained in conventional automobile-hauling trailer constructions was from 30,000 to 40,000 miles. Tire development has reached a point far in advance of other portions of modern vehicles and it has been generally conceded that longer tire wear could not be obtained by attempting to provide a new and different tire construction. Due to the substantial cost of large vehicle tires such as are used in automobile-hauling trailers, a means for lengthening the life of such tires has been sought.

Applicant has developed a novel, efficient, and relatively inexpensive solution to this problem by constructing the lower deck of the trailer to efficiently baffle air around the wheels and tires. It has been found in actual running conditions that applicant's construction produces tire mileages of approximately 75,000 miles which is roughly double the tire mileage experienced in the past with conventional trailer constructions. This unusual result is due to the lower operating temperature of the tires effected by the efficient baffling of air around the tires in transit.

It is a principal object of the present invention to provide a highway trailer construction wherein the air is efficiently baffled around the wheels and tires during travel to provide lower tire operating temperatures.

It is a further object of the present invention to provide an automobile-carrying highway trailer having a closed bottom which will accommodate the usual number of cars and protect the cars on the lower deck from corrosive splashings from the highway, said trailer having an open wheel housing to permit a ready flow of air therethrough for cooling the tires, wheels and brakes. It is another object of the present invention to provide an automobile-carrying highway trailer, which will accommodate the conventional number of cars and which is light and easy to haul.

Other objects of this invention will appear in the following description and appended claims, reference being had to the accompanying drawings forming a part of this specification wherein like reference characters designate corresponding parts in the several views.

In the drawings:

Fig. 1 is a side elevation of a trailer hauling tractor with a trailer embodying the present invention affixed thereto, a portion of the side of said trailer being broken away to reveal the internal construction.

Fig. 2 is a sectional view taken along the line 2—2 in the direction of the arrows, Fig. 1, portions of the sides of the trailer being broken away for clarity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a preferred embodiment is disclosed therein wherein an automobile-carrying trailer 6 attached to a tractor 8 is shown. The trailer is of the type which carries two automobiles on the upper deck and two automobiles back to back on the lower deck. The top structure and supporting posts are indicated generally at 10 and the side walls of the trailer are indicated generally at 12 in the drawings. These features may be of any conventional construction and are not critical to the present invention.

The important feature of the present invention is the construction of the lower deck 14 of the trailer. The lower deck 14 extends from a horizontal forward front wheel supporting portion 14A over the cut-out portion 16, inclines rearward and downward therefrom along the portion 14B to the horizontal centrally located rear wheel supporting portion 14C, then inclines upward and rearward along 14D at a sufficient angle to clear the rear trailer wheels 18, then declines sharply along 14E to the rearward front wheel supporting portion 14F.

The portions 14B and 14D have a relatively long slope to effect efficient baffling of the air flow around the tires and wheels of the tractor and trailer. As disclosed in Fig. 2 in the drawings, the lower deck is integral with the trailer frame to provide a closed lower deck construction.

In the preferred construction described herein a depending compartment 20, having a flat horizontal bottom and vertical sides, Fig. 2, is disposed between and suspended from the two lateral track portions 21 of the lower deck 14 at the rearward portion of the trailer. The compartment 20 may be conveniently used for carrying miscellaneous equipment and is centrally located so as not to interfere with the free flow of air around the trailer wheels 18. The compartment 20 does not extend the full length of the trailer so that the bottom of the forward portion of the trailer follows the contour of the deck portion 14B.

Referring to Fig. 2 of the drawings, the particular trailer construction disclosed herein has sides 12 composed of corrugated sheet metal. The top rail 24 is shown as a longitudinal channel member, enclosing the top edges of the corrugated sides 12, having parallel longitudinal edges 24A and 24B secured to each corrugation of the sides 12 on the inside and outside thereof by the plurality of rivets 26 and 28 respectively. The top rail 24 is bent outwardly to provide a longitudinally extending external upper rub rail 24C. The lower rail 30 is similarly constructed to enclose the bottom edges of the corrugated sides 12, and provides the parallel longitudinal edges 30A and 30B secured to each corrugation of the sides 12 on the inside and outside thereof by the plurality of rivets 32 and 34 respectively. The lower rail 30 is bent to provide an external longitudinally extending external lower rub rail 30C. Fig. 2 shows the upward extending flange 36 which runs along the side of each track 21 adjacent the trailer side 12 and is secured thereto by the plurality of rivets 38.

The forward sloping portion 14B of the lower deck 14 efficiently baffles the air stream around the rear wheels 22 of the tractor 8 in transit. The rear sloping portion 14D baffles the air stream around the wheels 18 of the trailer, and the tires and wheels are kept at a relatively low operating temperature. This not only vastly increases tire life but also effectively cools the brake mechanism so that the component parts thereof will not be subject to overheating.

From the above description it will be seen that I have provided a simple, practical, and novel solution to a prominent problem experienced in rubber-tire automobile-carrying highway trailers.

Having thus described my invention, I claim:

1. An automobile-carrying highway trailer having rear wheels with rubber tires mounted thereon and including a closed automobile-carrying deck having automobile wheel supports forward of said trailer rear wheels and below the level of the tops of said wheels and automobile wheel supports at the rear of the trailer wheels and above the level of said first-named wheel supports, said deck being inclined forward and upward from said second-named wheel supports to clear said trailer rear wheels, and being then inclined forward and downward along a long sloping portion to said first-named wheel supports, the long sloping portion overlying the rear wheels of the trailer at a substantial distance therefrom to provide an air conduit for effecting free circulation of air below said deck and around said trailer wheels to efficiently cool said trailer wheels and tires during travel, and a downwardly extending storage compartment formed in said sloping portion and extending substantially short of the sides of the trailer to provide air conduits on each side for the adjacent wheels.

2. In a compact and lightweight automobile-carrying highway semitrailer having rear wheels with rubber tires thereon and adapted for connection to a haulaway tractor also having rubber tires thereon, said trailer having a raised forward portion adapted to overlie the rear wheels of the tractor adjacent the point of pivotal connection therewith, the combination of a lower automobile carrying deck integral with and forming the closed bottom of the trailer frame and adapted to hold two automobiles back to back in tandem, said lower deck having centrally located rear wheel supporting portions below the level of the top of the trailer wheels and near the middle of the longitudinal axis of the trailer, forward front wheel supporting portions over the said raised forward portion of the said trailer, rearward front wheel supporting portions to the rear of the rear wheels of said trailer above the level of said centrally located rear wheel supporting portions, said lower deck being extended forward and upward from said rearward front wheel supporting portions to clear said trailer rear wheels and being then extended forward and downward along a long flat sloping rear air conduit to said centrally located rear wheel supporting portions, said lower deck also being inclined upward and forward from said centrally located rear wheel supporting portions along a long flat sloping forward air conduit to said forward front wheel supporting portions, the air conduits forming a small angle of slope with the horizontal and effecting a smooth free circulation of air around the wheels and tires of said trailer and tractor below said deck.

3. In an automobile-carrying highway trailer having rear wheels with rubber tires thereon and which is adapted for attachment at its forward end to a hauling tractor also having rear wheels with rubber tires thereon, a closed bottom deck having a flat horizontal middle section forming vehicle wheel supporting portions, a long flat sloping forward air conduit extending upward and forward from said middle section to a point near the front end of the trailer, vehicle wheel supporting portions located near the front end of the trailer, a long flat sloping rear air conduit extending upward and rearward from said middle section to a point near the rear end of the trailer, and vehicle wheel supporting portions located near the rear end of the trailer, said forward and rear air conduits each forming a small angle of slope with the horizontal and effecting smooth free circulation of air around the tires and wheels when the trailer is in operation.

LYNN M. FRANCIS.

References Cited in the file of this patent

UNITED STATES PATENTS

| Number | Name | Date |
|---|---|---|
| D. 100,164 | Judd | July 23, 1936 |
| 1,994,695 | Dolan et al. | Mar. 19, 1935 |
| 2,091,406 | Judd | Aug. 31, 1937 |
| 2,169,648 | Judd | Aug. 15, 1939 |